US012699187B2

(12) United States Patent
Yang et al.

(10) Patent No.: US 12,699,187 B2
(45) Date of Patent: Aug. 4, 2026

(54) REMOTE SENSING INVERSION METHOD, SYSTEM, DEVICE AND COMPUTER READABLE STORAGE MEDIUM FOR AEROSOL COMPONENT DISTRIBUTION

(71) Applicant: INSTITUTE OF ATMOSPHERIC PHYSICS, CHINESE ACADEMY OF SCIENCES, Beijing (CN)

(72) Inventors: Ting Yang, Beijing (CN); Futing Wang, Beijing (CN); Zifa Wang, Beijing (CN); Wei Zhang, Beijing (CN); Hongyi Li, Beijing (CN); Lei Xu, Beijing (CN)

(73) Assignee: INSTITUTE OF ATMOSPHERIC PHYSICS, CHINESE ACADEMY OF SCIENCES, Beijing (CN)

( * ) Notice: Subject to any disclaimer, the term of this patent is extended or adjusted under 35 U.S.C. 154(b) by 579 days.

(21) Appl. No.: 18/194,996

(22) Filed: Apr. 3, 2023

(65) Prior Publication Data

US 2024/0004082 A1     Jan. 4, 2024

(30) Foreign Application Priority Data

Jun. 30, 2022    (CN) .......................... 202210757390.1

(51) Int. Cl.
| | |
|---|---|
| *G01S 17/95* | (2006.01) |
| *G01N 1/22* | (2006.01) |

(Continued)

(52) U.S. Cl.
CPC .............. *G01S 17/95* (2013.01); *G01N 15/00* (2013.01); *G01S 17/006* (2013.01); *G01S 17/86* (2020.01);

(Continued)

(58) Field of Classification Search
CPC ........ G01S 17/95; G01S 17/006; G01S 17/86; G01S 7/4802; G01S 7/4808; Y02A 90/10;

(Continued)

(56) References Cited

FOREIGN PATENT DOCUMENTS

| | | | | | |
|---|---|---|---|---|---|
| CN | 103234877 | B | * | 3/2015 | |
| CN | 111595801 | A | * | 8/2020 | ........... G01N 21/359 |

OTHER PUBLICATIONS

Xie et al. ("Estimate of Atmospheric Columnar Aerosol Composition Based on Remote Sensing Measurements," IGARSS 2018—2018 IEEE International Geoscience and Remote Sensing Symposium, Valencia, Spain, 2018, pp. 7556-7559, doi: 10.1109/IGARSS.2018.8518479.) (Year: 2018).*

(Continued)

*Primary Examiner* — Christian T Bryant
(74) *Attorney, Agent, or Firm* — MUNCY, GEISSLER, OLDS & LOWE, P.C.

(57) ABSTRACT
According to the technical solution of the present invention, a vertical mass concentration curve of fine aerosol component distribution can be obtained based on remote sensing test cooperation of a ground Lidar and a solar photometer, specifically, an internal mixing model and a normalized volume distribution model are constructed according to the light absorptivity and the water solubility of aerosol components, and separates out profiles of inorganic salt components, black carbon components, water-soluble organic matter, water-insoluble organic matter, fine aerosol water content components and the like to obtain corresponding vertical distribution. A new thought and development direction can be provided for remote sensing inversion of Lidar and the like, and meanwhile, development of aerosol component spectrums is promoted. According to the comparison of on-site observation data and reanalysis data, the vertical distribution of aerosol components obtained by the technical (Continued)

solution is relatively reasonable, and has popularization value.

5 Claims, 8 Drawing Sheets

(51) Int. Cl.

| | |
|---|---|
| *G01N 15/00* | (2024.01) |
| *G01N 15/06* | (2024.01) |
| *G01N 15/075* | (2024.01) |
| *G01S 7/48* | (2006.01) |
| *G01S 17/00* | (2020.01) |
| *G01S 17/86* | (2020.01) |
| *G06F 17/18* | (2006.01) |

(52) U.S. Cl.
CPC ..... *G01N 2001/2223* (2013.01); *G01N 15/06* (2013.01); *G01N 15/075* (2024.01); *G01S 7/4802* (2013.01); *G01S 7/4808* (2013.01); *G06F 17/18* (2013.01); *Y02A 90/10* (2018.01)

(58) Field of Classification Search
CPC ...... G01N 15/00; G01N 15/06; G01N 15/075; G01N 2001/2223; G06F 17/18
See application file for complete search history.

(56) References Cited

OTHER PUBLICATIONS

Zhang et al. (Estimation of aerosol complex refractive indices for both fine and coarse modes simultaneously based on AERONET remote sensing products, Atmos. Meas. Tech., 10, 3203-3213, https://doi.org/10.5194/amt-10-3203-2017, Sep. 1, 2017.) (Year: 2017).*

Zhang et al. (Estimation of atmospheric columnar organic matter (OM) mass concentration from remote sensing measurements of aerosol spectral refractive indices, Atmospheric Environment, vol. 179, 2018, pp. 107-117, ISSN 1352-2310, https://doi.org/10.1016/j.atmosenv.2018.02.010.) (Year: 2018).*

Zhang et al. (Improved inversion of aerosol components in the atmospheric column from remote sensing data, Atmos. Chem. Phys., 20, 12795-12811, https://doi.org/10.5194/acp-20-12795-2020, Nov. 4, 2020.) (Year: 2020).*

* cited by examiner

REMOTE SENSING INVERSION METHOD, SYSTEM, DEVICE AND COMPUTER READABLE STORAGE MEDIUM FOR AEROSOL COMPONENT DISTRIBUTION

FIELD OF THE INVENTION

The present invention relates to the technical field of aerosol constituent detection, and in particular to a method, a system, a device and a computer readable storage medium for remote sensing inversion of aerosol component distribution.

DESCRIPTION OF THE PRIOR ART

Aerosol is particles suspended in air with a particle size of less than 100 μm. There are aerosol particles of different particle sizes and different chemical compositions in the environment which result in different impact for human health, climate, visibility, and quality of life. According to research in recent years, aerosols play an important role in our complex environment, and these particulates directly affect the earth's thermal balance through absorption, scattering, and radiation, and indirectly affect the composition of a small number of substances in the atmosphere, causing ozone and other chemicals to be generated or destroyed.

For aerosol studies, many documents have profound theoretical bases and models, and the studying of aerosol nature is not outside of actual sampling and telemetry, but limited by the fact that aerosols vary over time and space, there are still many uncertain factors that are not immediately known, such as distribution of aerosols, particle size and concentration. Wherein, the vertical distribution of aerosol components in the atmosphere is critical to estimate radiation forcing and atmospheric photochemical effects.

In the prior art, algorithms already exist that combine a solar/sky photometer with Lidar remote sensing: in order to pursue deeper synergy of Lidar and solar photometer, a generic aerosol search model of the combined radiometer and Lidar data was created by modifying the AERONET algorithm to adapt to the Lidar data. As one part of the broad atmospheric and surface property generic search model, the generic aerosol search model can obtain attribute profiles for fine mode and coarse mode particles. However, though the generic aerosol search model can quantitatively search aerosol, it still stays at the columnar level and cannot obtain flexible volume ratios of different constituents in the vertical direction.

SUMMARY OF THE INVENTION

For the problems of the prior art said above, the present invention provides a method, system, device and computer readable storage medium for remote sensing inversion of aerosol component distribution. In particular, a first aspect of the present invention is providing a method for remote sensing inversion of aerosol component distribution comprising the following steps:

Constructing an internal mixing model and a normalized volume distribution model based on the light absorptivity and water solubility of the aerosol component;

Obtaining a fine aerosol composition profile outputted by the generic aerosol search model based on detection data of a solar photometer and Lidar. The fine aerosol component profile comprising a first aerosol extinction amount and a volume concentration profile;

Obtaining a second aerosol extinction amount by the internal mixing model and the normalized volume distribution model based on the predetermined volume fractions and the volume concentration profile of the respective components of the aerosol;

Quantifying residual between the second aerosol extinction amount and the first aerosol extinction amount by the iterative kernel function to obtain optimal combination of corresponding volume fractions of respective component and take the optimal combination as aerosol component distribution profile.

In a possible implementation of the first aspect said above, the aerosol components comprise inorganic salt components, black carbon components, water soluble organic components, water insoluble organic components and fine aerosol water content components, wherein:

The complex refractive index of the inorganic salt components, the black carbon components, the water soluble organic components, and the water insoluble organic components are all different;

The content of fine aerosol water content components is depended on hygroscopicity of aerosol.

In a possible implementation of the first aspect said above, the internal mixing model is used to obtain the complex refractive index of an aerosol mixture, wherein, the effective dielectric constant of the aerosol mixture is:

$$\varepsilon_{mix}(\lambda) = \varepsilon_{host} + 3\varepsilon_{host} \left[ \frac{\sum_j \frac{\varepsilon_j(\lambda) - \varepsilon_{host}(\lambda)}{\varepsilon_j(\lambda) + 2\varepsilon_{host}(\lambda)} f_j}{1 - \sum_j \frac{\varepsilon_j(\lambda) - \varepsilon_{host}(\lambda)}{\varepsilon_j(\lambda) + 2\varepsilon_{host}(\lambda)} f_j} \right] \quad j = BC \text{ and } WIOM$$

$\varepsilon_{host}$ $\varepsilon_j$ Wherein, is the effective tolerance of the host environment, is the effective tolerance of insoluble material, BC is the black carbon, and WIOM is the water insoluble organic matter;

$\varepsilon_{host}$ $\varepsilon_j$ The host environment comprises a mixture of water soluble substances in the aerosol mixture and the corresponding complex refractive index of the host environment is:

$$m_{host}(\lambda) = \frac{\Sigma_j m_j(\lambda) f_j}{\Sigma_j f_j} \quad j = AN, AW \text{ and } WSOM$$

Wherein $m_j$ is the complex refractive index for component j, $f_j$ is the volume fraction for component j, AN is the inorganic salt component, AW is the fine aerosol water content component, WSOM is the water soluble organic matter;

The complex refractive index of the aerosol mixture comprises:

$$m = \sqrt{\frac{|\varepsilon(\lambda)| + \text{Re}(\varepsilon(\lambda))}{2}} + i\sqrt{\frac{|\varepsilon(\lambda)| - \text{Re}(\varepsilon(\lambda))}{2}}$$

Wherein m is complex refractive index, F is effective dielectric constant.

In a possible implementation of the first aspect said above, the normalized volume distribution of the aerosol mixture comprises:

$$\frac{dV_N(lnr)}{dlnr} = \sum_{j=1}^{4} f_j \frac{dV_j(lnr)}{dlnr} \quad j = AN, BC,$$

$$WIOM, \text{ and } WSOM \quad \frac{dV_N(lnr)}{dlnr} \frac{dV_j(lnr)}{dlnr} \quad 5$$

Wherein, is the normalized volume distribution profile, AN is the inorganic salt component, BC is the black carbon, WIOM is the water insoluble organic matter, WSOM is the water soluble organic matter, and is the corresponding volume distribution profile for component j;

$$\frac{dV_N(lnr)}{dlnr} \frac{dV_j(lnr)}{dlnr} \quad 15$$

The volume distribution profile corresponding to component j includes:

$$\frac{dV_j(lnr)}{dlnr} = \frac{1}{\sqrt{2\pi} |ln\sigma_j|} \exp\left[-\frac{1}{2}\left(\frac{lnr - lnr_j}{ln\sigma_j}\right)^2\right]$$

$\sigma_j r_j$ Wherein, is geometric standard deviation of component j, is mean radius of component j.

$\sigma_j r_j$ In a possible implementation of the first aspect said above, the second aerosol extinction amount comprises:

$$\sigma_m(\lambda, h) = \int \frac{3}{4r^2} Q_{ext}(\lambda, r, m) \frac{dV(lnr)}{dlnr} dlnr$$

$$Q_{ext}(\lambda, r, m) \lambda \frac{dV(lnr)}{dlnr}$$

Wherein, is Mie efficiency coefficient which is related to wavelength of Lidar, particle size r of aerosol, and complex refractive index m of aerosol mixture, is obtained by the product of volume concentration profile and normalized volume distribution.

$$Q_{ext}(\lambda, r, m) \lambda \frac{dV(lnr)}{dlnr} dlnr$$

In a possible implementation of the first aspect said above, the iterative kernel function comprises:

$$\chi^2 = \sum_{\lambda} \frac{(\sigma_m(\lambda, h) - \sigma_c(\lambda, h))^2}{\epsilon_g(\lambda, h)(\sigma_c(\lambda, h))^2}$$

$\sigma_c$ Wherein is the relative fitting residuals of the Lidar modelling signals between Lidar measurements and generic aerosol search model at different wavelengths, which are used to avoid uncertainty interference arising from generic aerosol search model modelling.

$\sigma_c$ In a possible implementation of the first aspect said above, the respective volume fractions of the inorganic salt component, the black carbon component and the fine aerosol water content component are obtained by a pre-set microscopic physical parameterization protocol according to the modification of the volume fractions of the water soluble organic component and the water insoluble organic component;

Wherein, there is a constraint relationship between the water soluble organic matter and water insoluble organic matter.

A second aspect of the present invention is providing a system for remote sensing inversion of aerosol component distribution for use in the method of remote sensing inversion of aerosol component distribution according to the first aspect said above;

The remote sensing inversion system of aerosol component distribution comprises:

A model building unit for building an internal mixing model and a normalized volume distribution model based on the light absorptivity and water solubility of the aerosol component;

A remote sensing obtaining unit for obtaining a fine aerosol component profile outputted by a generic aerosol search model based on detection data of a solar photometer and Lidar. The fine aerosol component profile includes a first aerosol extinction amount and a volume concentration profile;

A model derivation unit configured to obtain a second aerosol extinction amount by the internal mixing model and the normalized volume distribution model based on the pre-set volume fractions and the volume concentration profile of the respective components of the aerosol;

An iterative optimization unit for quantifying residual between the second aerosol extinction amount and the first aerosol extinction amount by means of iterative kernel function to obtain optimal combination of corresponding volume fractions of respective components and to take optimal combination as aerosol component distribution profile.

A third aspect of the present invention is providing a device for remote sensing inversion of aerosol component distribution, comprising:

A memory for storing a computer program;

A processor configured to execute computer program to implement method of remote sensing inversion of aerosol component distribution according to the first aspect said above.

A fourth aspect of the present invention is providing a computer readable storage medium having stored a computer program, when the computer program is executed by a processor, the method for remote sensing inversion of aerosol component distribution according to the first aspect said above is implemented.

The beneficial effects of the present invention compared to the prior art are described as follows.

According to the technical solution of the present invention, a vertical mass concentration curve of fine aerosol component distribution can be obtained based on remote sensing test cooperation of a ground Lidar and a solar photometer, specifically, an internal mixing model and a normalized volume distribution model are constructed according to the light absorptivity and the water solubility of aerosol components, and separates out profiles of inorganic salt matter, black carbon components, water-soluble organic matter, water-insoluble organic matter, fine aerosol water content components and the like to obtain corresponding vertical distribution conditions. According to the technical solution of the present invention, a new thought and development direction can be provided for remote sensing inversion of Lidar and the like, and meanwhile, development of aerosol component spectrums is promoted; according to the comparison of on-site observation data and reanalysis data, the vertical distribution of aerosol components obtained by the technical solution is relatively reasonable, and has popularization value.

BRIEF DESCRIPTION OF THE DRAWINGS

Other features, objects and advantages of the present invention will become more obvious by the detailed description of non-limiting embodiments with reference to the following drawings.

DETAILED DESCRIPTION OF THE PREFERRED EMBODIMENT

The invention will be described in detail with reference to the embodiments. The following embodiments will help those skilled in the art to further understand the invention, but not to limit the invention in any way. It should be noted that it will be obvious to those skilled in the art that more variations and modifications can be made without departing from the inventive concept. These are fallen in the scope of the present invention.

The term "include" and variations thereof mean open inclusion, that is to say "include, but not limited to". Unless specifically stated, the term "or" means "and/or". The term "based on" means "at least regionally based on." The terms "one example embodiment" and "one embodiment" mean "at least one example embodiment." The term "another embodiment" means "at least one further embodiment." The term "first", "Second" and the like may refer to different or the same object. Other explicit and implicit definitions may also be included below.

Figure 1:
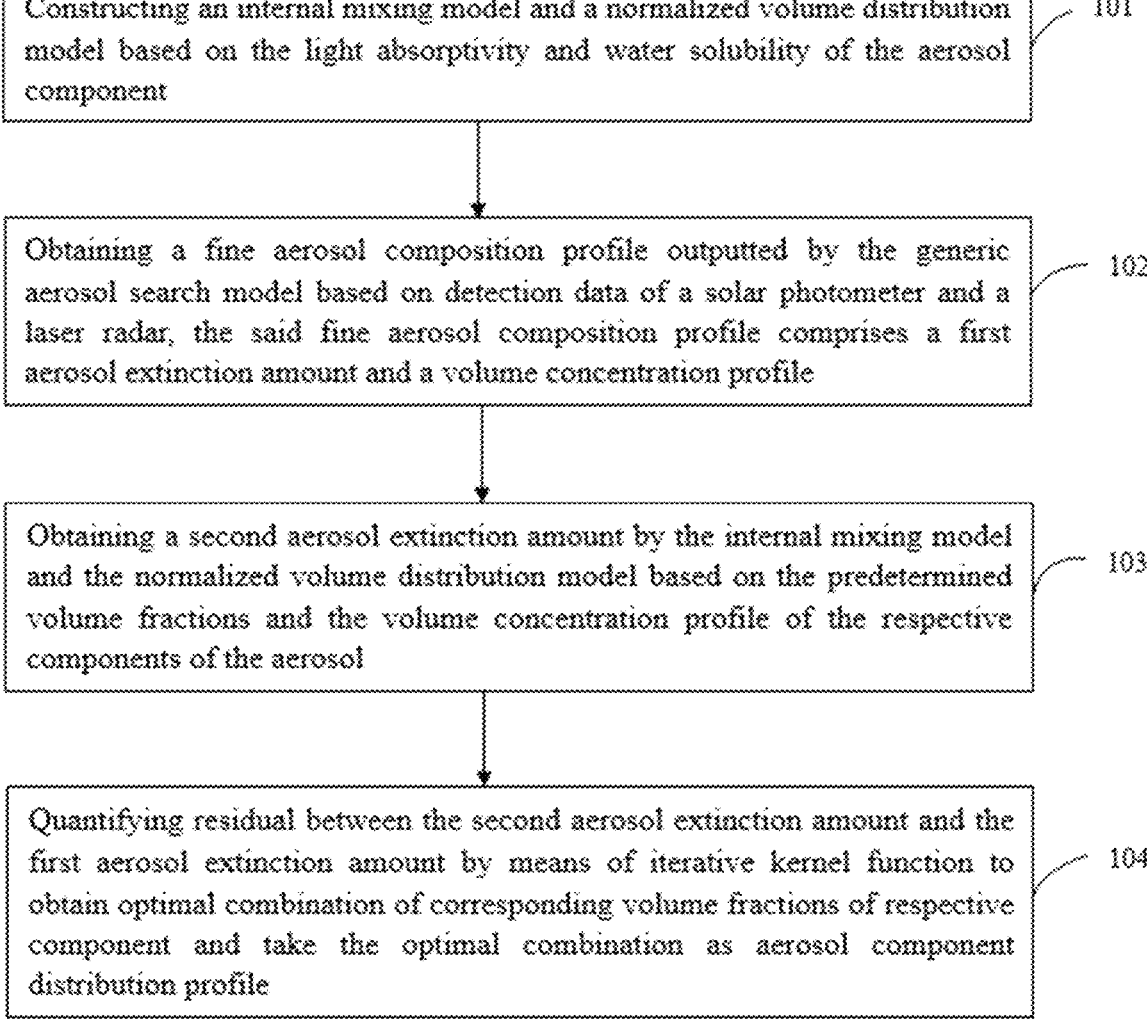
FIG. 1 shows a flow diagram of a method for remote sensing inversion of aerosol component distribution according to an embodiment of the present invention.

As for the problems of the prior art, in some embodiments provided by the present invention, FIG. 1 shows a flow diagram of a method for remote-sensing inversion of aerosol component distribution. As shown in FIG. 1, the method for remote-sensing inversion of aerosol component distribution may include: Step 101: Constructing internal mixing model and normalized volume distribution model based on light absorptivity and water solubility of aerosol components. Wherein, specific construction of internal mixing model and normalized volume distribution model will be described in more detail below.

It should be understand that in the present and subsequent possible embodiments of the present invention, the aerosol components may include an inorganic salt component, a black carbon component, a water soluble organic matter, a water insoluble organic matter, and a fine aerosol water content component. It is possible to separate the aerosol components by remote sensing data, because the aerosol components described above have different size distributions and different complex refractive indices. In particular, Table 1 shows the microscopic physical parameters of the aerosol components said above including complex refractive index (CRI), mean radius of log normal distribution, geometric standard deviation and density. It is not difficult to understand from Table 1 that the complex refractive index of the black carbon components is the greatest at different wavelengths due to the strong optical absorption capability. In contrast, the inorganic salt components, such as nitrates and sulfates and the like, are mainly characterized by surface scattering, and the complex refractive index is the minimal except for the fine aerosol water content component. In particular, the content of the fine aerosol water content components is directly dependent on the water absorption of the inorganic salt component at a certain ambient relative humidity, in particular at severe haze episodes. In the water soluble organic matter, hygroscopicity is the key to distinguish water soluble organic and inorganic salt components: Since the growth factors of the inorganic salt component are all above 1.5, much greater than the growth factors of the water-soluble organic component. The hygroscopicity of the aerosol is thus believed that it is derived from the inorganic salt component but not the water-soluble organic matter.

TABLE 1

| | microscopic physical parameters of the aerosol components | | | | |
| --- | --- | --- | --- | --- | --- |
| | BC | WIOM | WSOM | AN | AW |
| C       532 nm | 1.95-0.79i | 1.56-0.06i | 1.53-0.003i | 1.41-2.3e−3i | 1.33 |
| RI    1064 nm | 1.95-0.79i | 1.54-0.001i | 1.53-0.001i | 1.40-6.8e−3i | 1.33 |
| $r_m$ (µm) | 0.095 | 0.126 | 0.126 | 0.17 | — |
| σ | 1.8 | 1.49 | 1.49 | 2 | — |
| ρ (g cm$^{-3}$) | 2.0 | 1.2 | 1.2 | 1.76 | 1.0 |

7

Step 102: Obtaining fine aerosol component outputted by generic aerosol search model based on the detection data of solar photometer and Lidar. The fine aerosol component profile comprises the first aerosol extinction amount and volume concentration profile.

It should be understand that the volume concentration profile provided by the generic aerosol search model establishes a relationship between the retrieval by the solar photometer and the Lidar, such that complex refractive index and volume distribution can be directly used to construct aerosol models in Lidar algorithms based on Mie theory. However, since Mie theory only works for spherical particles, it contradicts the irregular shape of the sand dust aerosol. In general, the aerosol volume distribution is assumed to be bimodal in the search algorithm, and the sand dust aerosol is distributed in coarse mode. Thus the technical solution of the present invention focuses only on fine aerosol component profiles outputted by the generic aerosol search model, wherein, aerosol extinction amount and volume concentration profile in fine mode may be included. Similar to the AERONET algorithm, the generic aerosol search model took a radius of 0.576 μm as the separation point for the aerosol size. The retrieved fine mold aerosol components, including the inorganic salt component, black carbon component, water soluble organic matter and water insoluble organic matter, are all distributed in the PM1 interval (i.e. Particles with aerodynamic diameter less than 1 μm). To a certain extent, a fine mode cutoff radius of 0.576 μm is reasonable for inversion.

Step 103: Obtaining a second aerosol extinction amount by the internal mixing model and the normalized volume distribution model based on the predetermined volume fractions and the volume concentration profile of the respective components of the aerosol. Specific means of obtaining the second aerosol extinction amount will be explained in detail in the following.

Step 104: quantifying residual between the second aerosol extinction amount and the first aerosol extinction amount by means of iterative kernel function to obtain optimal combination of corresponding volume fractions of respective component and to take the optimal combination as aerosol component distribution profile.

The vertical mass concentration distribution profile of fine aerosol component such as inorganic salt components can be achieved by above steps 101 to 104, which will be described further below.

In a specific implementation of the above embodiments, in the preceding step 101, the internal mixing model is used to obtain the complex refractive index of the aerosol, and the normalized volume distribution model is used to obtain the volume size distribution of the aerosol. It should be understand that the aerosol model provided by the present invention is constructed based on Mie theory, for which both complex refractive index (CRI) as well as volume size distribution (VSD) are desired.

In the above embodiments, in a practical atmospheric environment, internal mixing of aerosols is prevalent due to collisions, condensation and chemical reactions. During the process of internal mixing model establishment, Maxwell-Garnett (MG) mixing rules can be adopted to adapt to the mixing of water insoluble matter embedded in the host environment. Wherein the effective dielectric constant of the aerosol mixture can be:

8

$$\varepsilon_{mix}(\lambda) = \varepsilon_{host} + 3\varepsilon_{host} \left[ \frac{\Sigma_j \frac{\varepsilon_j(\lambda) - \varepsilon_{host}(\lambda)}{\varepsilon_j(\lambda) + 2\varepsilon_{host}(\lambda)} f_j}{1 - \Sigma_j \frac{\varepsilon_j(\lambda) - \varepsilon_{host}(\lambda)}{\varepsilon_j(\lambda) + 2\varepsilon_{host}(\lambda)} f_j} \right] \quad j = BC \text{ and } WIOM \quad (1)$$

Wherein, $\varepsilon_{host}$ is the effective tolerance of the host environment, $\varepsilon_j$ is the effective tolerance of insoluble material, BC is the black carbon, and WIOM is the water insoluble organic matter. The host environment comprises a mixture of water soluble substances in the aerosol mixture, namely the inorganic salt component, the fine aerosol water content component and the water soluble organic matter, $\varepsilon_{host}$ and $\varepsilon_j$ can be deduced by:

$$m = \sqrt{\frac{|\varepsilon(\lambda)| + \text{Re}(\varepsilon(\lambda))}{2}} + i\sqrt{\frac{|\varepsilon(\lambda)| - \text{Re}(\varepsilon(\lambda))}{2}} \quad (2)$$

Wherein, m is complex refractive index, and F is effective dielectric constant.

For a host environment, the complex refractive index can be derived by volume average (VA) rule of mixtures to enforce physical constraints between multi-component liquid systems, the corresponding complex refractive index for the host environment can be:

$$m_{host}(\lambda) = \frac{\Sigma_j m_j(\lambda) f_j}{\Sigma_j f_j} \quad j = AN, AW \text{ and } WSOM \quad (3)$$

$m_j$ is the complex refractive index for component j, $f_1$ is the volume fraction for component j, AN is the inorganic salt component, AW is the fine aerosol water content component, WSOM is the water soluble organic matter.

$f_j$ Based on combination of formulas (1) to (3), complex refractive index of aerosol mixture can be obtained.

$f_j$ In another particular implementation of the above embodiments, in the preceding step 103, during the obtaining of volume size distribution of the aerosol, the normalized volume distribution of each component in the dry state can be simulated according to the log normal distribution parameters in Table 1. Considering the hygroscopicity of the inorganic salt component, the normalized volume distribution of the inorganic salt component in an environment of a given relative humidity can be fitted by introducing a growth factor, the fine aerosol water content components are taken into account at the same time, and in turn, a normalized volume distribution model of the aerosol mixture can be established from the assumed component volume fractions as shown in equation (4) below:

$$\frac{dV_N(lnr)}{dlnr} = \sum_{j=1}^{4} \frac{dV_j(lnr)}{dlnr} \quad j = AN, BC, WIOM, \text{ and } WSOM \quad (4)$$

Wherein, $$\frac{dV_N(lnr)}{dlnr}$$

is the normalized volume distribution profile, AN is the inorganic salt component, BC is the black carbon, WIOM is the water insoluble organic matter, WSOM is the water soluble organic matter, and $$\frac{dV_j(lnr)}{dlnr}$$

is the corresponding volume distribution profile for component j;

Furthermore, the volume distribution corresponding to component j may include:

$$\frac{dV_j(lnr)}{dlnr} = \frac{1}{\sqrt{2\pi}\,|ln\sigma_j|}\exp\left[-\frac{1}{2}\left(\frac{lnr - lnr_j}{ln\sigma_j}\right)^2\right] \quad (5)$$

Wherein, $\sigma_j$ is the geometric standard deviation of component j, $r_j$ is mean radius of component j, both can be obtained from Table 1.

After obtaining the complex refractive index and the volume distribution, the extinction coefficients $\sigma_m(\lambda, h)$ at different wavelengths and levels can be modelled according to Mie theory and combining the volume concentration curve corresponding to the volume concentration profile outputted by the generic aerosol search model. The second aerosol extinction amount can comprise:

$$\sigma_m(\lambda, h) = \int \frac{3}{4r^2}Q_{ext}(\lambda, r, m)\frac{dV(lnr)}{dlnr}dlnr \quad (6)$$

Wherein, $Q_{ext}(\lambda, r, m)$ is Mie efficiency coefficient, which is related to wavelength $\lambda$ of Lidar, particle size r of aerosol, and complex refractive index m of aerosol mixture, $$\frac{dV(lnr)}{dlnr}dlnr$$

is obtained by the product of volume concentration profile and normalized volume distribution.

In another specific implementation of the embodiments said above, in the step 104, the residual between the modeled extinction amount $\sigma_m$ and the fine-mode extinction amount $\sigma_c$ from the generic aerosol search model may be quantified by an iterative kernel function $\chi^2$ to find the best combination of component volume fractions, wherein the iterative kernel function may comprise:

$$\chi^2 = \Sigma_\lambda \frac{(\sigma_m(\lambda, h) - \sigma_c(\lambda, h))^2}{\epsilon_g(\lambda, h)(\sigma_c(\lambda, h))^2} \quad (7)$$

Wherein $\sigma_c$ is the relative fitting residuals of the Lidar modelling signals between Lidar measurements and generic aerosol search model at different wavelengths, which are used to avoid uncertainty interference arising from generic aerosol search model modelling.

Furthermore, the volume fraction of the component can be converted to a mass concentration $M_j(h)$ by the density $(\rho_j)$ of aerosol component j:

$$M_j(h) = f_j(h) \times V(h) \times \rho_j; \quad j = \text{AN,AW,BC,WIOM, and} \\ \text{WSOM} \quad (8)$$

According to the specific implementations said above, specific implementations of steps 101 to 104 in preceding embodiments can be realized.

In some embodiments of the present invention, a microscopic physical parameterization solution matching the technical solutions said above is also provided. In particular, firstly, water soluble and water insoluble substances can be separated by this parameterization solution and re-parameterized on the basis thereof by relative humidity (RH), wherein the volume ratio of water insoluble to water soluble can be expressed as follows.

$$\frac{f_i}{f_s} = \varphi(RH)\int \varepsilon(D)dD \quad (9)$$

$$\varphi(RH) = 5.74(1 - RH)^3 + 0.01 \quad (10)$$

$$\varepsilon(D) = \varepsilon_0 + \varepsilon_v * \exp\left[-\left(\frac{\log(D/d_0)}{\sigma_{\log}}\right)^2\right] \quad (11)$$

Wherein $f_i$ and $f_s$ are the volume fractions of water insoluble and water soluble respectively, and $\varphi(RH)$ is the re-parameterized portion of the function with RH; $\varepsilon(D)$ is a climatic function of the fraction of water soluble objects; D is the aerosol diameter; and $\varepsilon_0$, $\varepsilon_v$, $d_0$ and $\sigma_{\log}$ are average fitted parameters which may represent general aerosol properties.

Furthermore, for water-soluble substances, it can be based on the assumption that the inorganic salt component is the only hygroscopic ingredient. In order to strengthen the interaction between the inorganic salt component and the fine aerosol water content component, applying the relationship between solute mass concentration and water activity in the present invention, the volume ratio of inorganic salt component to fine aerosol water content component can be obtained by combining equations (12) to (15):

$$a_w = 1 + \sum_{k=1}^{4} C_k x^k \quad (12)$$

$$RH = a_w/100 \quad (13)$$

$$\rho_s = 0.9971 + \sum_{k=1}^{4} A_k x^k \quad (14)$$

$$\frac{f_{AN}}{f_{AN} + f_{AW}} = x\frac{\rho(x)}{\rho(100)} \quad (15)$$

Wherein $a_w$ is the activity of water, which is approximated to relative humidity due to the lower curvature effect, $\rho_s$ is the solution density, x is the weight percent of the inorganic salt component. $C_k$ and $A_k$ are the polynomial coefficient of ammonium nitrate as representative of the inorganic salt component. $f_{AN}$ And $f_{AW}$ are the volume fractions of the inorganic salt component and the fine aerosol water content component respectively. In this way, the growth factor (GF) of the inorganic salt component can be obtained, which plays an important role in the aerosol normalized volume distribution model:

$$GF(RH) = \frac{r_{wet}(RH)}{r_{dry}} = \sqrt[3]{\frac{f_{AN} + f_{AW}}{f_{AN}}} \quad (16)$$

Wherein $r_{dry}$ is the radius of dry particles, $r_{wet}$ is the radius of particles in a given relative humidity environment.

Based on the above relationship, the desired result can be achieved by only two unknowns. In the technical solution of the present invention, based on the microscopic physical parameterization solution described above, the corresponding volume fractions of the inorganic salt component, the black carbon component and the fine aerosol water content component can be obtained according to the change of the volume fraction of the water-soluble organic matter and the water-insoluble organic matter. More importantly, there is a constraint relationship between the water-soluble organic matter and the water-insoluble organic matter, thereby further ensuring the reliability of the inversion.

According to the embodiments said above, obtaining of the aerosol component distribution can be realized by the technical solution of the present invention. Verification of the obtained aerosol component distribution will also be provided below.

Figure 2A:
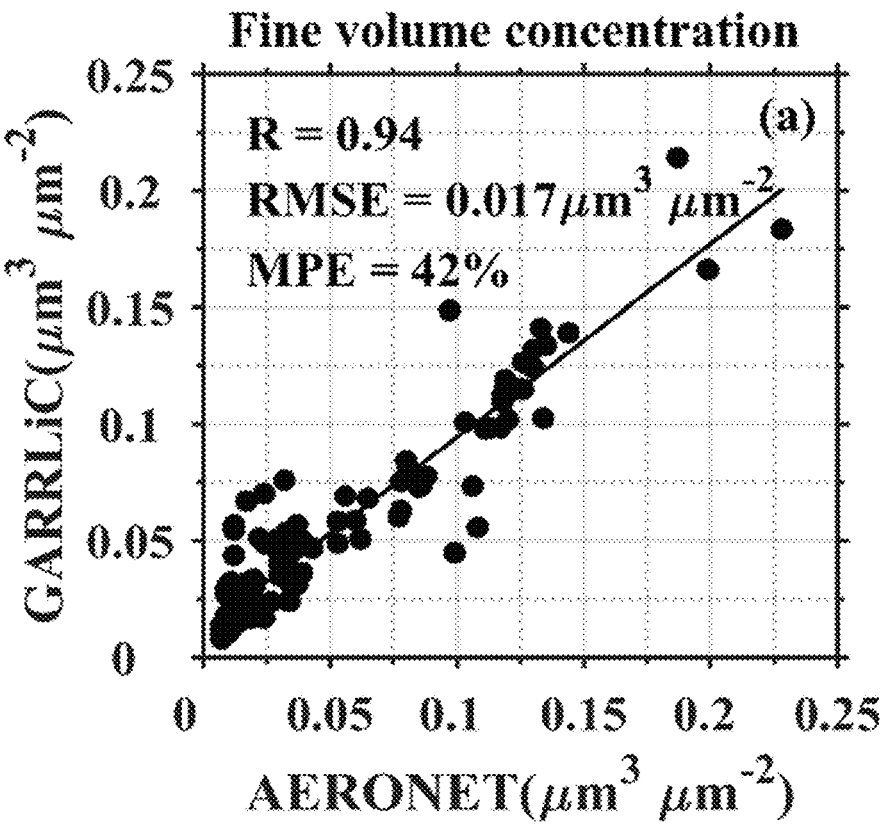
FIG. 2a shows a comparison of fine columnar volume concentrations between the generic aerosol search model and the AERONET algorithm according to an embodiment of the present invention.
Figure 2B:
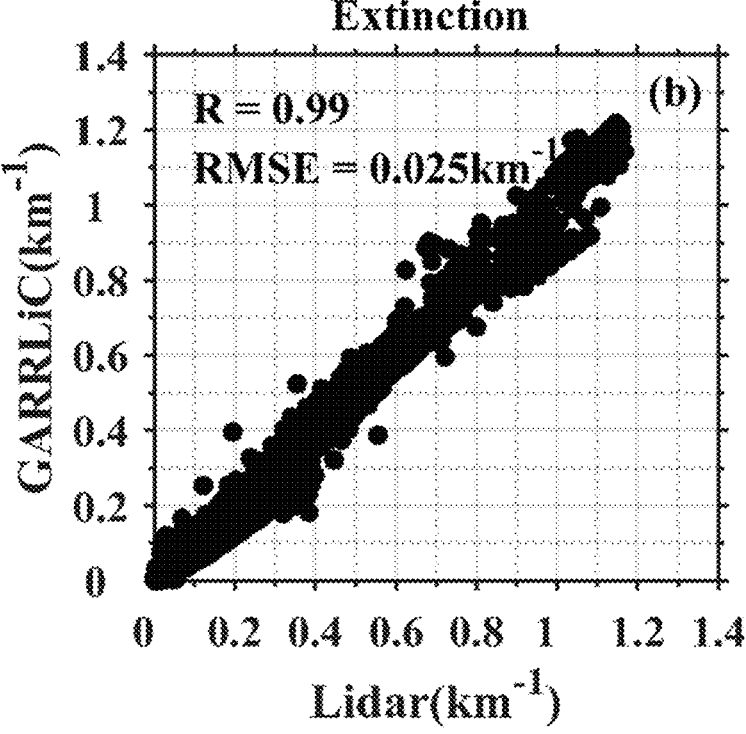
FIG. 2b shows a comparison the extinction coefficient of the generic aerosol search model with the search results of the Fernald method in accordance with an embodiment of the present invention.
Figure 2C:
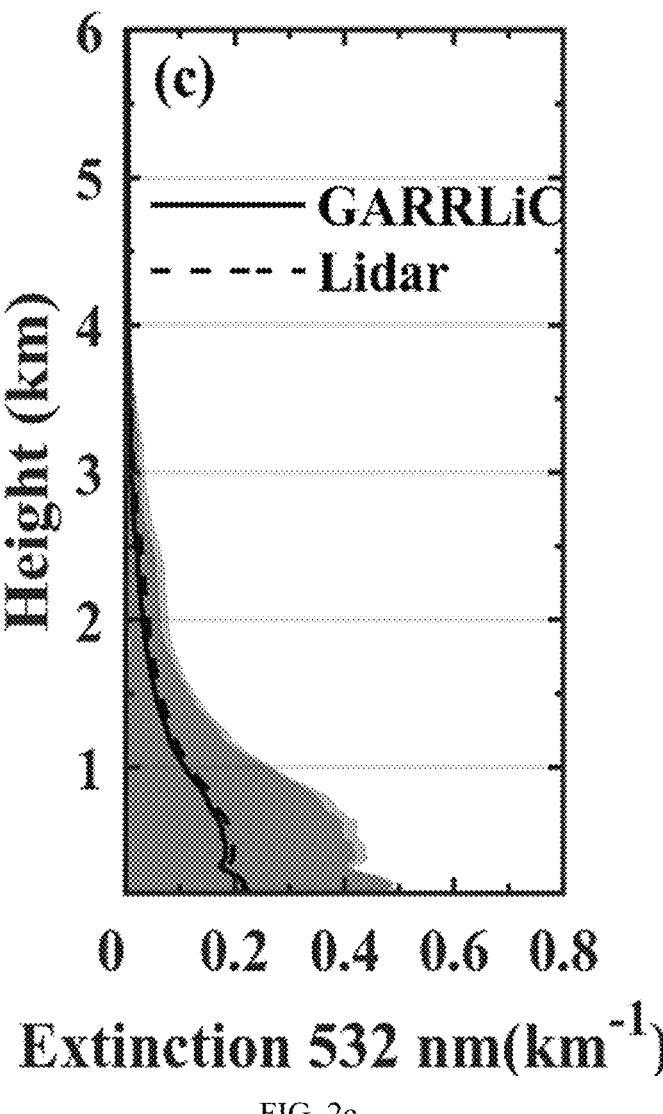
FIG. 2c shows a generic aerosol search model and a vertical distribution of extinction coefficients for Lidar according to an embodiment of the present invention.

During the above verification of profile black carbon, since the generic aerosol search model provides inputting and constraint for algorithm, the reliability of output of the generic aerosol search model directly determines the accuracy of the inversion of the component distribution, so the output of the generic aerosol search model must be validated based on the product of the AERONET algorithm. The AERONET algorithm is widely used for validation of remote sensing results, since the volume concentration curve under the AERONET algorithm cannot be directly obtained. FIG. 2a shows a comparison of fine columnar volume concentrations between the generic aerosol search model and the AERONET algorithm. It is clear that, the correlation coefficient R can reach 0.94, the root mean square error RMSE is only 0.017. Average percentage error MPE which is the average error percentage from the real case is about 42%, this deviation is acceptable, because the estimation uncertainty of the complex refractive index is about 50% in the secondary AERONET algorithm product. Furthermore, FIG. 2b shows a comparison of the extinction coefficient of the generic aerosol search model with the search results of the Fernald method, wherein the Lidar ratio is 50 sr. As can be seen from FIG. 2b, these two results are highly consistent with a correlation coefficient R close to 1. FIG. 2c shows the vertical distribution of the extinction coefficients for the generic aerosol search model and for the Lidar: it is clear that the extinction mean and standard deviation curves for both are almost coincide, which confirms the validity of output of the generic aerosol search model.

Figure 3A:
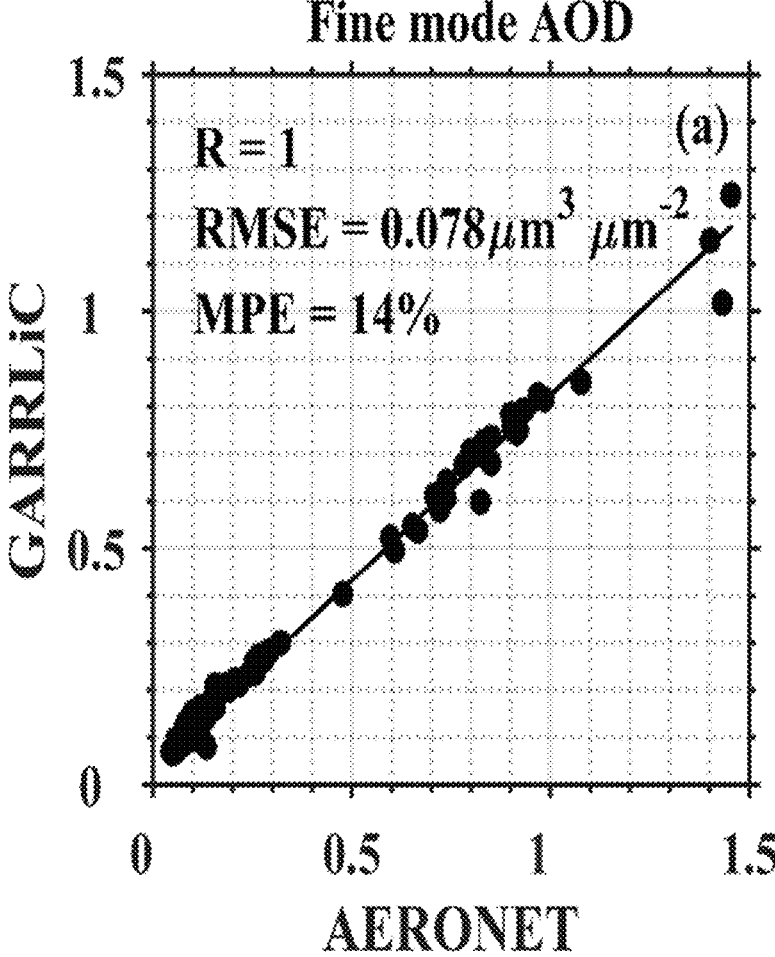
FIG. 3a shows a comparison of a generic aerosol search model and a fine mode AOD of the AERONET algorithm according to an embodiment of the present invention.
Figure 3B:
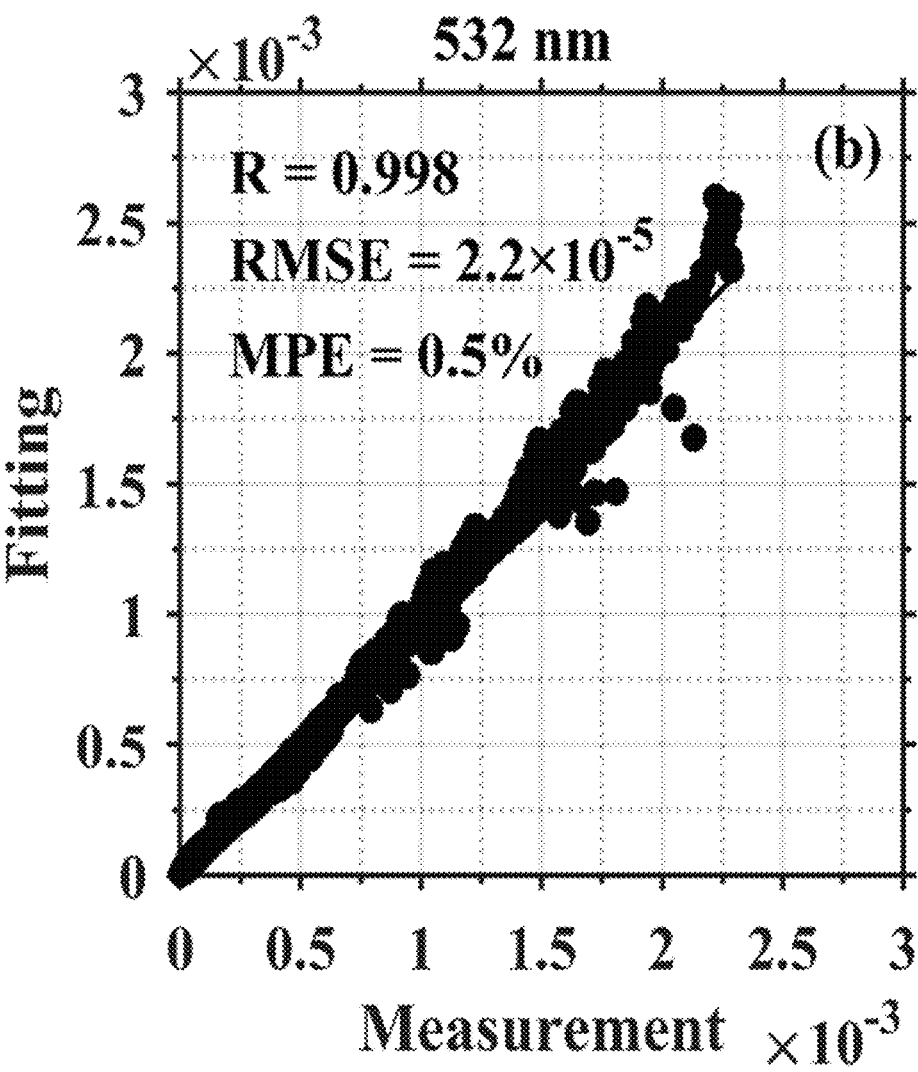
FIG. 3b shows a comparison between a fitting of a generic aerosol search model and a Lidar signal measured at 532 nm according to an embodiment of the present invention.
Figure 3C:
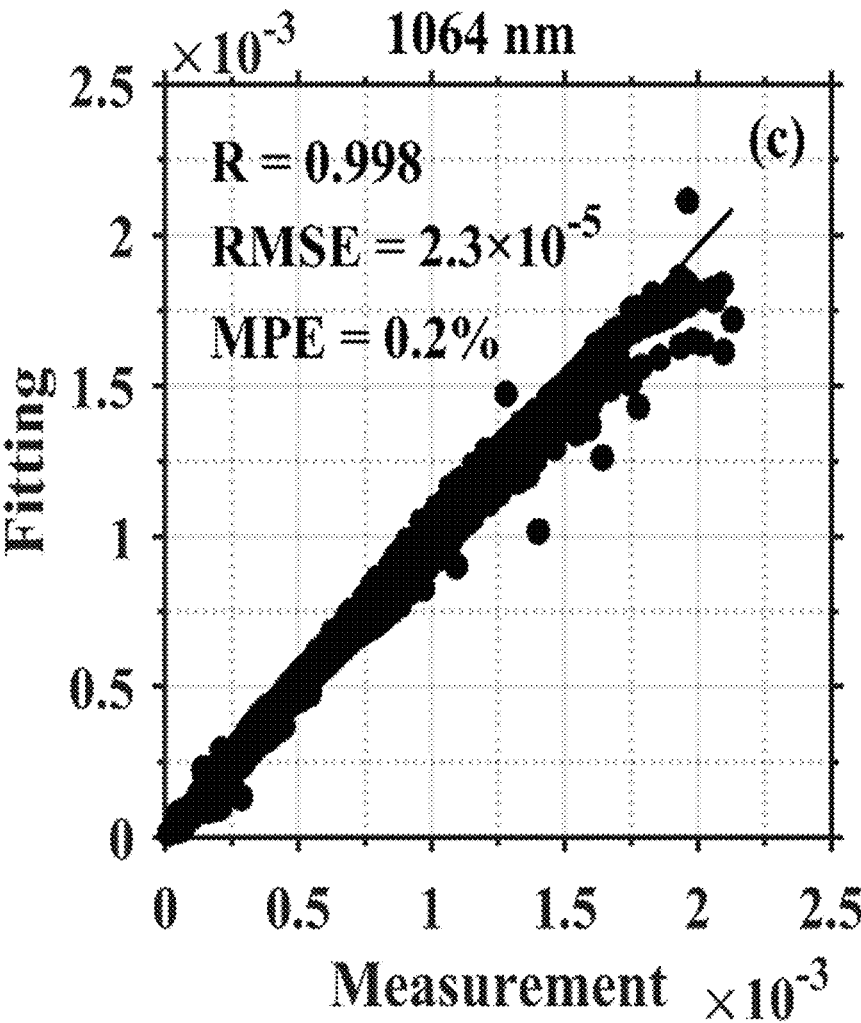
FIG. 3c shows a comparison between a fitting of a generic aerosol search model and a Lidar signal measured at 1064 nm according to an embodiment of the present invention.

In fact, the extinction profile of the generic aerosol search model depends directly on the fine mode AODs and the aerosol vertical profile, which is searched by the Lidar signal. Thus the fine mode AOD and the fitted Lidar signal can also be verified by the AERONET algorithm and measurements of the Lidar signal respectively. As shown in FIGS. 3a-3c, not only the fine mode AOD, but also the fitted Lidar signal are all in good agreement with the respective reference values, with a correlation coefficient R value greater than 0.99; whereas the total MPE for fine extinction of both wavelengths is around 14%, which mainly depends on the fine mode AOD, because the fit error of the vertical LIDAR signals is small. All the above analyses show that the fine volume concentration and extinction profiles from the generic aerosol search model are reliable enough to drive component search.

It should be understand that it is not difficult to see based on the above verification that the uncertainty in component search is mainly derived from errors in the input parameters, i.e. Relative humidity, volume concentration and extinction coefficient. The relative humidity indirectly influences the component estimation through a parameterized protocol while the parameterized protocol is closely related relative humidity which is an input parameter. Based on theoretical studies in the prior art, when RH is not more than 85%, the average error is about 31.6%. Considering that the influence of the input parameter on the parameterized protocol always exists, in the above embodiments of the present invention, it is possible to set 55% as the critical point for higher and lower relative humidity to evaluate the uncertainty brought by the input parameters. In particular, a Monte Carlo method may be employed in the above embodiments, the input parameters were randomly generated based on a Gaussian distribution, with the original values and errors being the mean and standard deviation respectively. When applied to the Monte Carlo method, each input parameter was sampled for 30 iterations at different heights, wherein the relative uncertainty described by the ratio of the standard deviation to the mean value of the 30 iteration results.

Figures 4, 5:
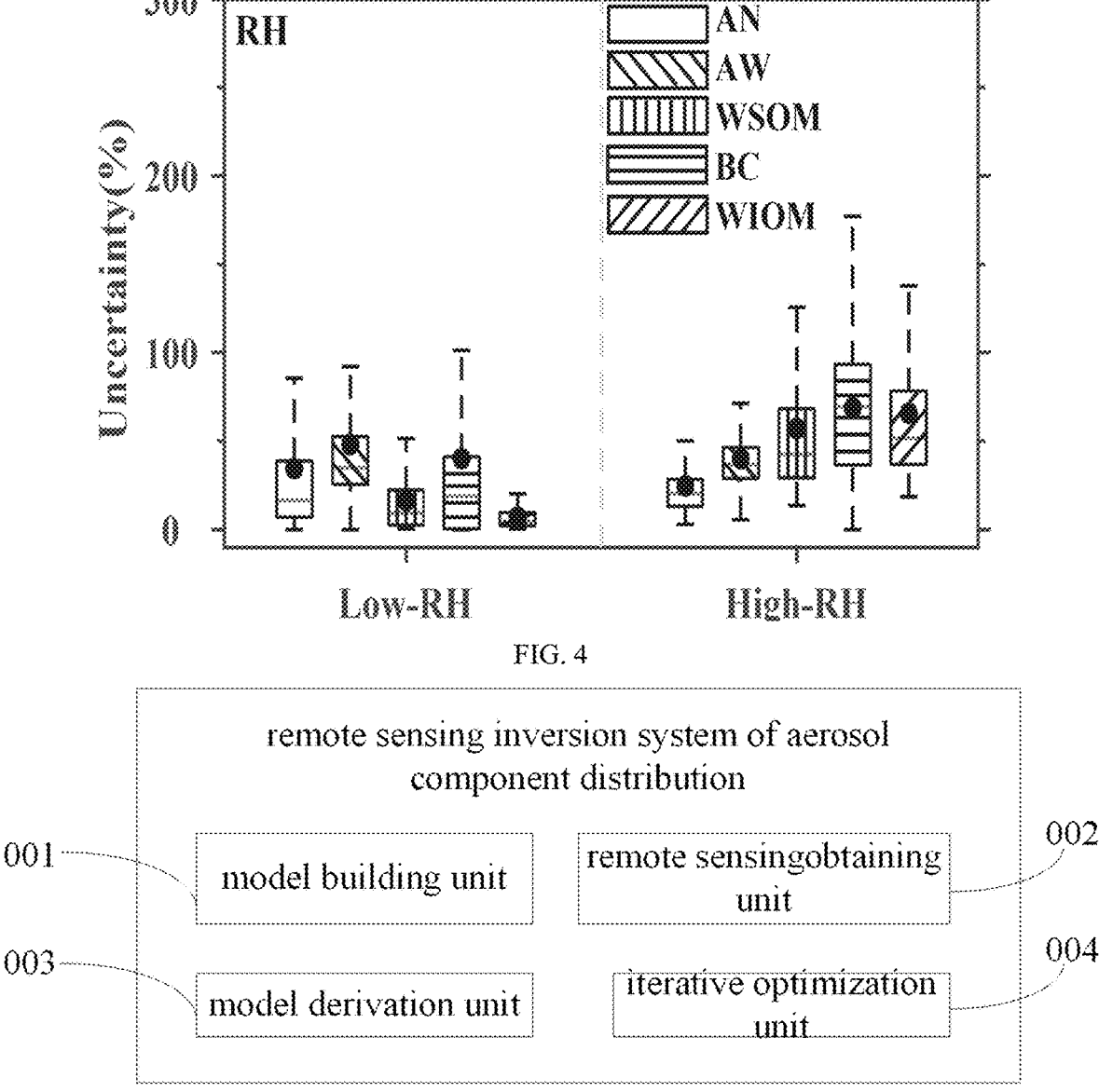
FIG. 4 shows the uncertainty of inorganic salt, black carbon, water soluble organic, water insoluble organic and fine aerosol water content at different relative humidities according to an embodiment of the present invention.
FIG. 5 is a structural diagram of a remote sensing inversion system of aerosol component distribution according to an embodiment of the present invention.

Furthermore, FIG. 4 shows the uncertainty of the inorganic salt component, black carbon component, water soluble organic matter, water insoluble organic matter and fine aerosol water content component at different relative humidity. It is not difficult to see from FIG. 4 that the uncertainty of the component estimation of the aerosol has a similar quantitative relationship: At higher relative humidity, the uncertainty of the inorganic salt component and the fine aerosol water content component is less than at lower relative humidity, which is consistent with the parameterized protocol described in the previous examples being closer to the actual case at higher relative humidity; Conversely, a higher relative humidity increases the uncertainty of the black carbon component, the water-soluble organic matter, and the water-insoluble organic matter, this may be due to an increased error in the volume ratio of water-insoluble and water-soluble caused below a higher relative humidity. It should be noted that Uncertainties in aerosol components, such as black carbon components in emission lists, tend to reach 200% or even higher. Component searching and distribution obtaining by the technical solutions provided by the present invention are valuable.

In some embodiments of the present invention, FIG. 5 shows the structure of a system for remote-sensing inversion of aerosol components distribution which is employed in the method for remote-sensing inversion of aerosol component distribution according to the previous embodiments. In particular, as shown in FIG. 5, the system for remote sensing inversion of aerosol component distribution may include:

A model building unit 001 for building an internal mixing model and a normalized volume distribution model based on the light absorptivity and water solubility of the aerosol component.

A remote sensing obtaining unit 002 for obtaining a fine aerosol component profile outputted by a generic aerosol search model based on detection data of a solar photometer and Lidar. The fine aerosol component profile includes a first aerosol extinction amount and a volume concentration profile.

A model derivation unit configured to obtain a second aerosol extinction amount by the internal mixing model and the normalized volume distribution model based on the pre-set volume fractions and the volume concentration profile of the respective components of the aerosol.

An iterative optimization unit 004 for quantifying residual between the second aerosol extinction amount and the first aerosol extinction amount by means of iterative kernel function to obtain optimal combination of corresponding volume fractions of respective components and to take optimal combination as aerosol component distribution profile.

It should be understand that functions implemented by model building unit 001 to iterative optimization unit 004 in above-described functional modules are in one-to-one correspondence with steps 101 to 104.

It will be appreciated that various aspects of the present invention may be embodied as a system, method or program product. Therefore, various aspects of the present invention may be embodied in the form of an entirely hardware-implemented method, an entirely software-implemented method (including firmware, microcode, etc.) or an implemented method combining hardware and software that may all generally be referred to herein as a "circuit," "module" or "platform."

It will be apparent to those skilled in the art that the units or modules or steps of the invention described above may be implemented with a general computing device, which may be centralized on a single computing device, or distributed over a network composed of computing devices. Alternatively, which may be implemented in program code executable by a computing device, thus, they may be stored in a storage medium for execution by a computing device, and in some cases, steps shown or described may be performed in a different order, or separately fabricated as individual integrated circuit modules, or fabricated as a single integrated circuit module for multiple modules or steps.

Figure 6:
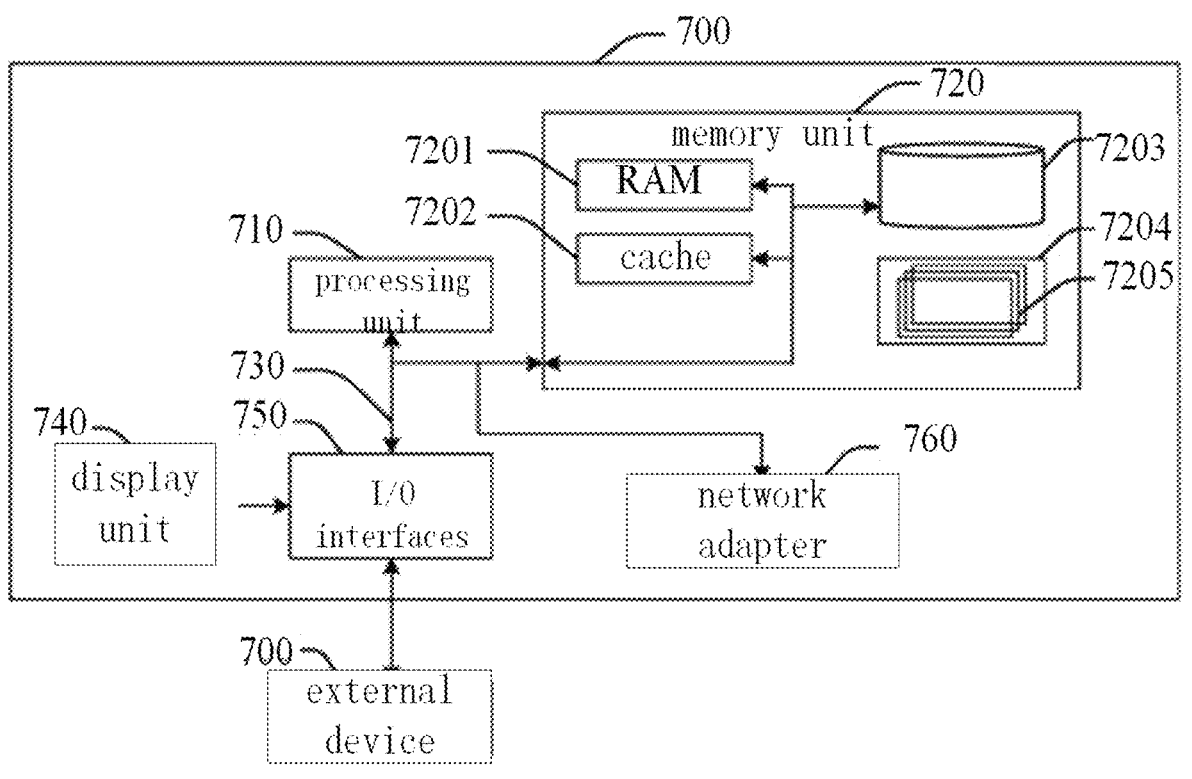
FIG. 6 is a structural diagram of an electronic device according to an embodiment of the present invention.

FIG. 6 shows a structural diagram of an electronic device according to some embodiments of the present invention, the electronic device is used for the realization of the remote sensing inversion method in the embodiments said above. The electronic device 600 used in the implementation method of this embodiment is described in detail below with reference to FIG. 6. The electronic device 600 shown in FIG. 6 is only one example, and is not a limitation for the function and scope of use of any embodiment of the technical solution of the present invention.

As shown in FIG. 6, the electronic device 600 takes form of general purpose computing device. The assembly of electronic device 600 may include but is not limited to at least a processing unit 610, at least a memory unit 620, a bus 630 connecting different platform components (including memory unit 620 and processing unit 610), display unit 640, and so on.

Therein, memory unit stores program code that can be executed by processing unit 610 to cause processing unit 610 to carry out implementation of respective functional modules in remote sensing inversion system of aerosol component distribution described above in this embodiment.

The memory unit 620 may include readable media in form of volatile memory units such as random access units (RAM) 6201 and/or cache memory units 6202 and may further include read only memory unit (ROM) 6203.

The memory unit 620 may further include a program/utility 6204 having set (at least one) of program modules 6205 that include but are not limited to an operating system, one or more application programs, other program modules, and program data, each or some combination of which may include implementation of networking environment.

The bus 630 may represent one or more types of buses, and includes memory unit bus or memory unit controller, peripheral bus, image accelerated port, processing unit or local bus using any of the various bus architectures.

The audio-video signal synchronization processing device 600 can be communicated with one or more external devices

700 (such as keyboards, pointing devices, Bluetooth, etc), and further can be communicated with one or more devices that enable a user to interact with the electronic device 600, and/or be communicated with any devices (such as routers, modems, etc.) that enable the electronic device to communicate with one or more other computing devices. Such communication may be realized by Input/Output (I/O) Interfaces 650. Furthermore, electronic device 600 can be communicated with one or more networks (such as a local area network (LAN), a wide area network (WAN), and/or a public network, such as the Internet) through network adapter 660. Network adapter 660 can be communicated with other modules of electronic device 600 via bus 630. As should be appreciated, although not shown in FIG. 6, other hardware and/or software modules including but not limited to microcode, device drivers, redundant processing units, external disk drive arrays, RAID systems, tape drives, data backup storage platforms and the like may be used in conjunction with electronic device 600.

In some embodiments of the present invention, a computer-readable storage medium is further provided which having stored a computer program, when the computer program is executed by a processor, various functional modules in the display screen control system said above can be realized.

Although this embodiment does not describe other specific implementations, but in some possible implementations, various aspects described in the present invention may also be implemented in the form of a program product including program code, when the program product runs on the terminal device, the program code causes the terminal device to execute the steps of various embodiments of the present invention described in the area of the image stitching method.

Figure 7:
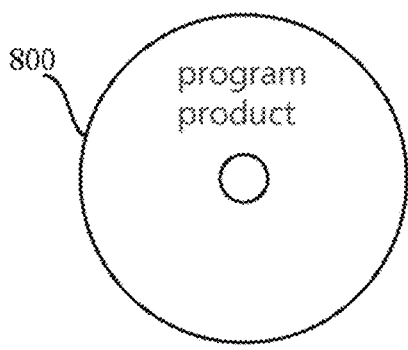
FIG. 7 is a structural diagram of a computer-readable storage medium according to an embodiment of the present invention.

FIG. 7 shows a structural schematic of a computer readable storage medium according to some embodiments of the present invention. As shown in FIG. 7, a program product 800 for implementing the above-described method in an embodiment according to the present invention is described therein, which may employ a portable compact disc read-only memory (CD-ROM) and comprise a program code, and may be run on a terminal device such as a personal computer. Of course, the program product produced in accordance with the present embodiments is not limited in this regard, and in the present invention, the readable storage medium may be any tangible medium that contains or stores a program for use by or in connection with an instruction execution system, apparatus, or device.

The program product may employ any combination of one or more readable media. A readable medium may be a readable signal medium or a readable storage medium. A readable storage medium may be, for example, but not limited to an electronic, magnetic, optical, electromagnetic, infrared, or semiconductor system, apparatus, or device, or any combination of the above. More specific examples (a non-exhaustive list) of readable storage media include: an electrical connection having one or more wires, a portable disc, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

A computer readable storage medium may include a data signal propagated in baseband or as a region of a carrier wave carrying readable program code. Such propagated data signal may take a variety of forms, including but not limited to an electromagnetic signal, an optical signal or any suitable combination of the signals said above. A readable storage medium may also be any readable medium other than a readable storage medium. The readable medium can transmit, propagate or transport the program for an instruction execution system, apparatus or device. Program code embodied on a readable storage medium may be transmitted by any appropriate medium, including but not limited to wireless, wire, optical fiber cable, RF, etc., or any suitable combination of the foregoing.

Program code for carrying out operations of the present invention may be written in any combination of one or more programming languages. Programming languages include object oriented programming languages such as Java, C++, or the like, and further include conventional procedural programming languages such as the C language or similar programming languages. The program code may execute entirely on the user computing device, regionally on the user device, as a stand-alone software package, regionally on the user computing device and regionally on a remote computing device, or entirely on the remote computing device or server. In cases of a remote computing device, the remote computing device may be connected to the user computing device through any type of network including a local area network (LAN) or a wide area network (WAN), or be connected to an external computing device (for example, through the Internet by the Internet Service Provider).

In summary, according to the technical solution of the present invention, a vertical mass concentration curve of fine aerosol component distribution can be obtained based on remote sensing test cooperation of a ground Lidar and a solar photometer, specifically, an internal mixing model and a normalized volume distribution model are constructed according to the light absorptivity and the water solubility of aerosol components, and separates out profiles of inorganic salt components, black carbon components, water-soluble organic matter, water-insoluble organic matter, fine aerosol water content components and the like to obtain corresponding vertical distribution conditions. According to the technical solution of the present invention, a new thought and development direction can be provided for remote sensing inversion of Lidar and the like, and meanwhile, development of aerosol component spectrums is promoted; according to the comparison of on-site observation data and reanalysis data, the vertical distribution of aerosol components obtained by the technical solution is relatively reasonable, and has popularization value.

The above description is only a description of the preferred embodiments of the present invention and is not any limitation for the scope of the present invention, and any changes and modifications made by a person skilled in the art in light of the above disclosure are all within the scope of protection of the claims.

What is claimed is:

1. A remote sensing inversion method of aerosol component distribution, comprising:

constructing an internal mixing model and a normalized volume distribution model based on light absorptivity and water solubility of aerosol components;

detecting data using a solar photometer and a Lidar;

obtaining a fine aerosol component profile outputted by a generic aerosol search model based on the detection data of the solar photometer and the Lidar, the fine aerosol component profile comprises a first aerosol extinction amount and a volume concentration profile;

obtaining a second aerosol extinction amount by the internal mixing model and the normalized volume distribution model based on predetermined volume fractions and the volume concentration profile of the respective aerosol components;

quantifying residual between the second aerosol extinction amount and the first aerosol extinction amount by an iterative kernel function;

determining an optimal combination of corresponding volume fractions of respective component from the quantified residual;

defining the optimal combination as an aerosol component distribution profile;

determining a vertical mass concentration curve of the aerosol component distribution based on the aerosol component distribution profile, wherein the aerosol components comprise inorganic salt components, black carbon components, water soluble organic matter, water insoluble organic matter and fine aerosol water content components, wherein a complex refractive index of the inorganic salt components, the black carbon components, the water soluble organic matter, and the water insoluble organic matter are all different, wherein a content of fine aerosol water content components is depended on hygroscopicity of aerosol, wherein the internal mixing model is used to obtain the complex refractive index of an aerosol mixture, wherein an effective dielectric constant of the aerosol mixture is:

$$\varepsilon_{mix}(\lambda) = \varepsilon_{host} + 3\varepsilon_{host}\left[\frac{\sum_j \frac{\varepsilon_i(\lambda) - \varepsilon_{host}(\lambda)}{\varepsilon_j(\lambda) + 2\varepsilon_{host}(\lambda)}f_j}{1 - \sum_j \frac{\varepsilon_j(\lambda) - \varepsilon_{host}(\lambda)}{\varepsilon_j(\lambda) + 2\varepsilon_{host}(\lambda)}f_j}\right]$$

$$j = BC \text{ and } WIOM$$

wherein $\varepsilon_{host}$ is the effective tolerance of the host environment, $\varepsilon_j$ is the effective tolerance of insoluble material, BC is the black carbon, and WIOM is the water insoluble organic matter, wherein said host environment comprises a mixture of water soluble substances in the aerosol mixture and the corresponding complex refractive index of the host environment is:

$$m_{host}(\lambda) = \frac{\sum_j m_j(\lambda)f_j}{\sum_j f_j}$$

$$j = AN, AW \text{ and } WSOM$$

wherein $m_j$ is the complex refractive index for component j, $f_j$ is the volume fraction for component j, AN is the inorganic salt component, AW is the fine aerosol water content component, WSOM is the water soluble organic matter, wherein the complex refractive index of the said aerosol mixture comprises:

$$m = \sqrt{\frac{|\varepsilon(\lambda)| + \mathrm{Re}(\varepsilon(\lambda))}{2}} + i\sqrt{\frac{|\varepsilon(\lambda)| - \mathrm{Re}(\varepsilon(\lambda))}{2}} \qquad 5$$

wherein m is complex refractive index and $\varepsilon$ is effective dielectric constant,
wherein the normalized volume distribution of the aerosol mixture comprises:

$$\frac{dV_N(lnr)}{dlnr} = \sum_{j=1}^{4} f_j \frac{dV_j(lnr)}{dlnr} \qquad 15$$

$$j = AN, BC, WIOM, \text{ and } WSOM$$

wherein $$\frac{dV_N(lnr)}{dlnr}$$

is the normalized volume distribution profile, AN is the inorganic salt component, BC is the black carbon, WIOM is the water insoluble organic matter, WSOM is the water soluble organic matter, and $$\frac{dV_j(lnr)}{dlnr} \qquad 35$$

is the corresponding volume distribution profile for component j,
  wherein volume distribution profile corresponding to component j includes:

$$\frac{dV_j(lnr)}{dlnr} = \frac{1}{\sqrt{2\pi} |ln\sigma_j|} \exp\left[ -\frac{1}{2}\left(\frac{lnr - lnr_j}{ln\sigma_j}\right)^2 \right] \qquad 45$$

wherein $\sigma_j$ is geometric standard deviation of component j, $r_j$ is mean radius of component j,
wherein the second aerosol extinction amount comprises: 50

$$\sigma_m(\lambda, h) = \int \frac{3}{4r^2} Q_{ext}(\lambda, r, m) \frac{dV(lnr)}{dlnr} dlnr$$

wherein $Q_{ext}(\lambda, r, m)$ is Mie efficiency coefficient, which is related to wavelength $\lambda$ of Lidar, particle size r of aerosol, and complex refractive index m of aerosol mixture, $$\frac{dV(lnr)}{dlnr} dlnr$$

is obtained by the product of volume concentration profile and normalized volume distribution, and
  wherein the iterative kernel function comprises:

$$\chi^2 = \sum_{\lambda} \frac{(\sigma_m(\lambda, h) - \sigma_c(\lambda, h))^2}{\varepsilon_g(\lambda, h)(\sigma_c(\lambda, h))^2}$$

wherein $\sigma_c$ is the relative fitting residuals of Lidar modelling signals between Lidar measurements and generic aerosol search model at different wavelengths, which are used to avoid uncertainty interference arising from generic aerosol search model modelling.
  2. The remote sensing inversion method according to claim 1, wherein respective volume fractions of the inorganic salt component, the black carbon component and the fine aerosol water content component are obtained by a pre-set microscopic physical parameterization protocol according to a modification of the volume fractions of a water soluble organic component and a water insoluble organic component, and
    wherein there is a constraint relationship between the water soluble organic component and water insoluble organic component.
  3. A remote sensing inversion system of aerosol component distribution, being used in the remote sensing inversion method of aerosol component distribution according to claim 1,
    wherein the remote sensing inversion system of aerosol component distribution includes: a model building unit for building an internal mixing model and a normalized volume distribution model based on the light absorptivity and water solubility of the aerosol component,
    wherein a remote sensing obtaining unit for obtaining a fine aerosol component profile outputted by a generic aerosol search model based on detection data of a solar photometer and a Lidar, the fine aerosol component profile including a first aerosol extinction amount and a volume concentration profile,
    wherein a model derivation unit configured to obtain a second aerosol extinction amount by the internal mixing model and the normalized volume distribution model based on the pre-set volume fractions and the volume concentration profile of the respective components of the aerosol, and
    wherein an iterative optimization unit for quantifying residual between the second aerosol extinction amount and the first aerosol extinction amount by means of iterative kernel function to obtain optimal combination of corresponding volume fractions of respective components and to take optimal combination as aerosol component distribution profile.
  4. A device for remote sensing inversion of aerosol component distribution, comprising:
    a memory for storing a computer program;
    a processor configured to execute computer program to implement method of remote sensing inversion of aerosol component distribution according to claim 1.
  5. A computer readable storage medium, having stored a computer program, wherein when the computer program is executed by a processor, the method for remote sensing inversion of aerosol component distribution according claim 1 is implemented.

\*    \*    \*    \*    \*